United States Patent
Chattin et al.

(10) Patent No.: US 7,918,717 B2
(45) Date of Patent: Apr. 5, 2011

(54) MACHINE FOR CLEANING FOWL AND METHOD OF USE THEREOF

(75) Inventors: Johnny Allen Chattin, Dahlonega, GA (US); Scott L. Davis, Dahlonega, GA (US)

(73) Assignee: Davis Poultry Equipment, Inc., Dawsonville, GA (US)

( * ) Notice: Subject to any disclaimer, the term of this patent is extended or adjusted under 35 U.S.C. 154(b) by 0 days.

(21) Appl. No.: 12/421,788

(22) Filed: Apr. 10, 2009

(65) Prior Publication Data

US 2009/0311956 A1 Dec. 17, 2009

Related U.S. Application Data

(63) Continuation of application No. 11/698,662, filed on Jan. 26, 2007, now Pat. No. 7,537,515.

(51) Int. Cl.
*A22C 18/00* (2006.01)
(52) U.S. Cl. ........................................ 452/123
(58) Field of Classification Search ............... 452/74–77, 452/81, 83–91, 93, 99, 119, 173
See application file for complete search history.

(56) References Cited

U.S. PATENT DOCUMENTS

| | | | |
|---|---|---|---|
| 2,054,576 A | 9/1936 | Waugh | |
| 2,305,232 A * | 12/1942 | Barker | 452/93 |
| 2,536,826 A | 1/1951 | Taus | |
| 3,137,031 A | 6/1964 | Ine | |
| 3,673,637 A * | 7/1972 | Crane | 452/91 |
| 3,797,068 A * | 3/1974 | Dillon | 452/76 |
| 3,803,669 A | 4/1974 | Dillon | |
| 4,106,161 A | 8/1978 | Niccolls | |
| 4,282,632 A * | 8/1981 | Conaway | 452/90 |
| 4,330,903 A * | 5/1982 | Vilotti | 452/92 |
| 4,535,509 A | 8/1985 | Bullock et al. | |
| 4,557,016 A | 12/1985 | Markert | |
| 4,876,767 A | 10/1989 | Harben, III et al. | |
| 4,882,811 A | 11/1989 | Ewing | |
| 4,899,421 A | 2/1990 | Van Der Eerden | |
| 5,041,054 A * | 8/1991 | van den Nieuwelaar et al. | 452/123 |
| 5,538,467 A * | 7/1996 | Wodajo | 452/119 |
| 5,605,503 A * | 2/1997 | Martin | 452/173 |
| 5,628,680 A | 5/1997 | Hjorth | |
| 5,863,245 A * | 1/1999 | Elduayen et al. | 452/88 |
| 6,035,806 A | 3/2000 | Lorenzo | |
| 6,083,095 A | 7/2000 | Simmons | |
| 6,146,263 A | 11/2000 | Mostoller et al. | |
| 6,213,864 B1 * | 4/2001 | Griffiths et al. | 452/173 |

* cited by examiner

*Primary Examiner* — Thomas Price
(74) *Attorney, Agent, or Firm* — Alston & Bird LLP

(57) ABSTRACT

A machine for cleaning fowl by removal of residual viscera and bacteria the machine comprising a wand with brushing tendrils attached to a tip, wherein the tip has exits for spraying cleaning fluid there from. The tip is attached to a rotating hollow shaft into which the cleaning fluid is introduced. Fowl are secured to hangers and the hangers are transported on a track to and around the machine. While passing around the machine, the wand is inserted into the fowl for cleaning thereof. The wand rides on a fixed cam comprising timed upward and downward guide tracks which transmit upward and downward movement to the wand, thereby inserting it into, and removing it from, the carcass of a fowl.

16 Claims, 5 Drawing Sheets

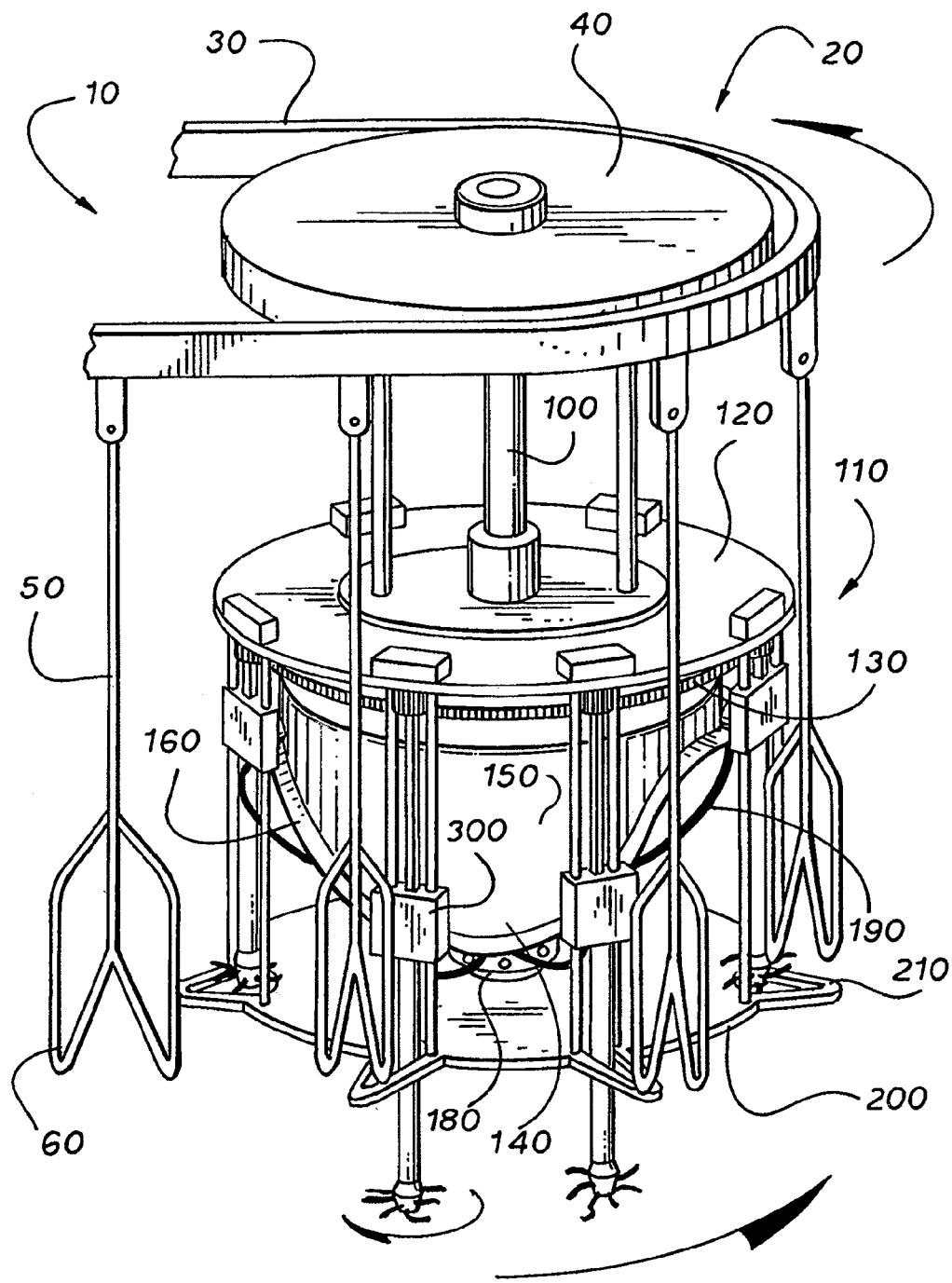
Fig_1

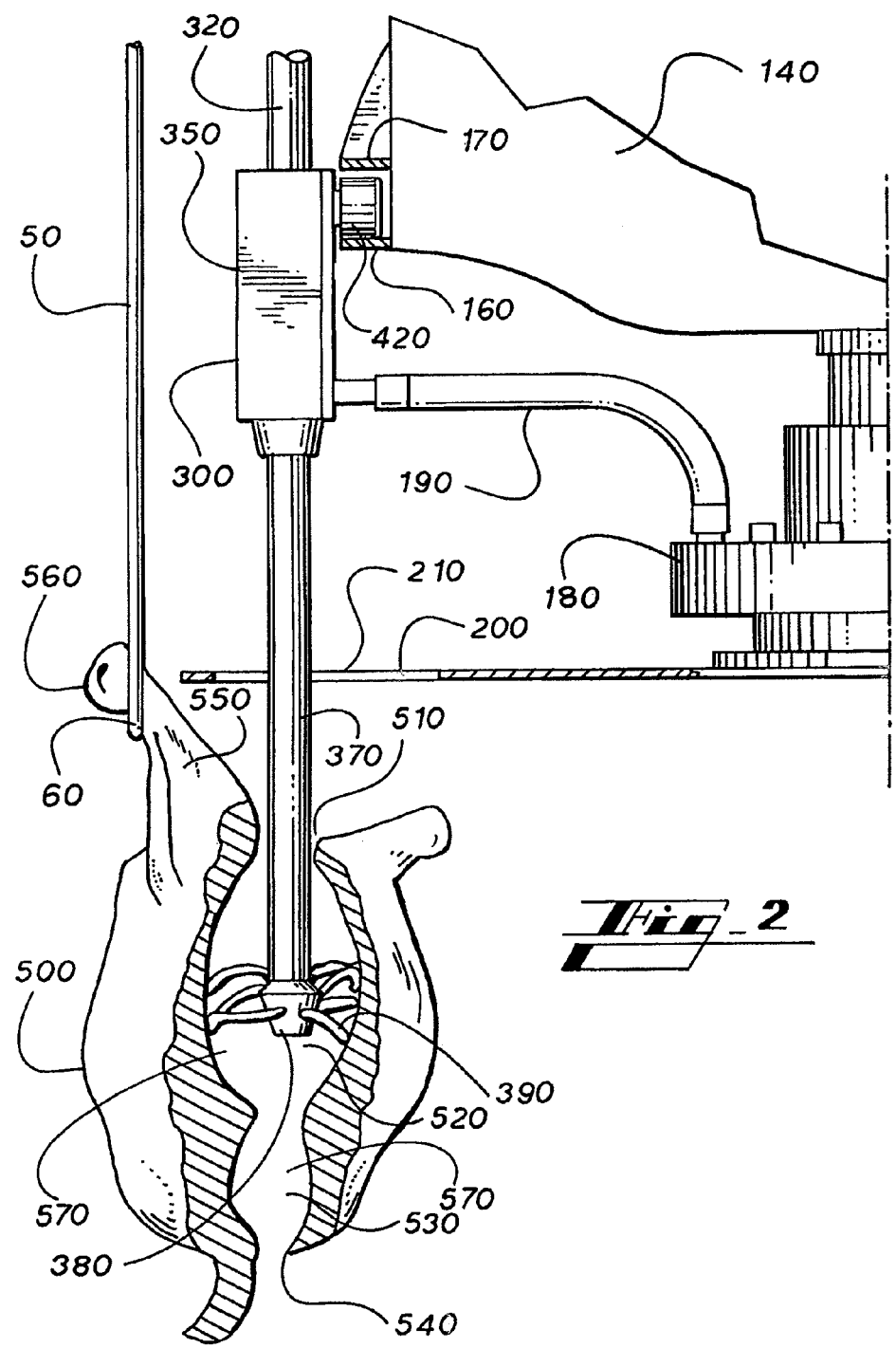
Fig_2

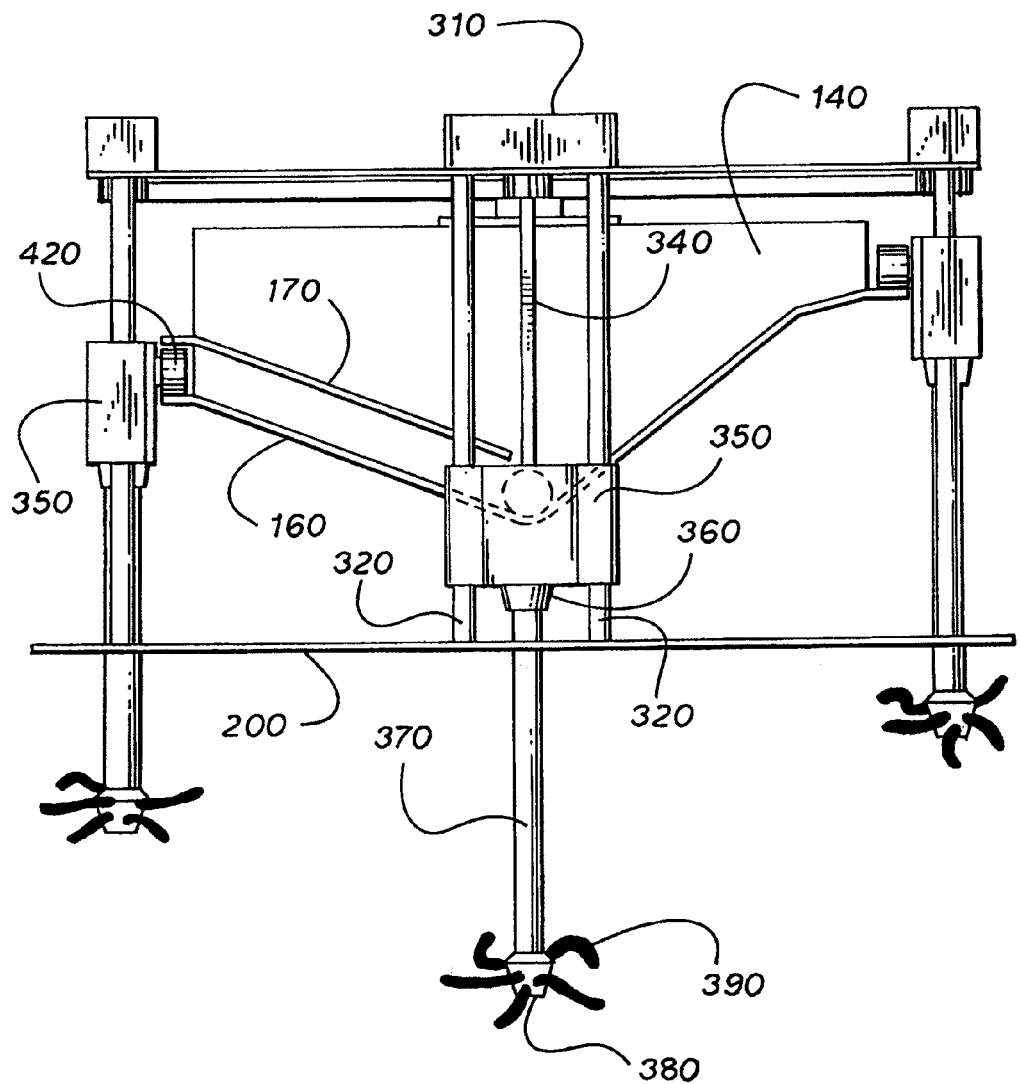
Fig_3

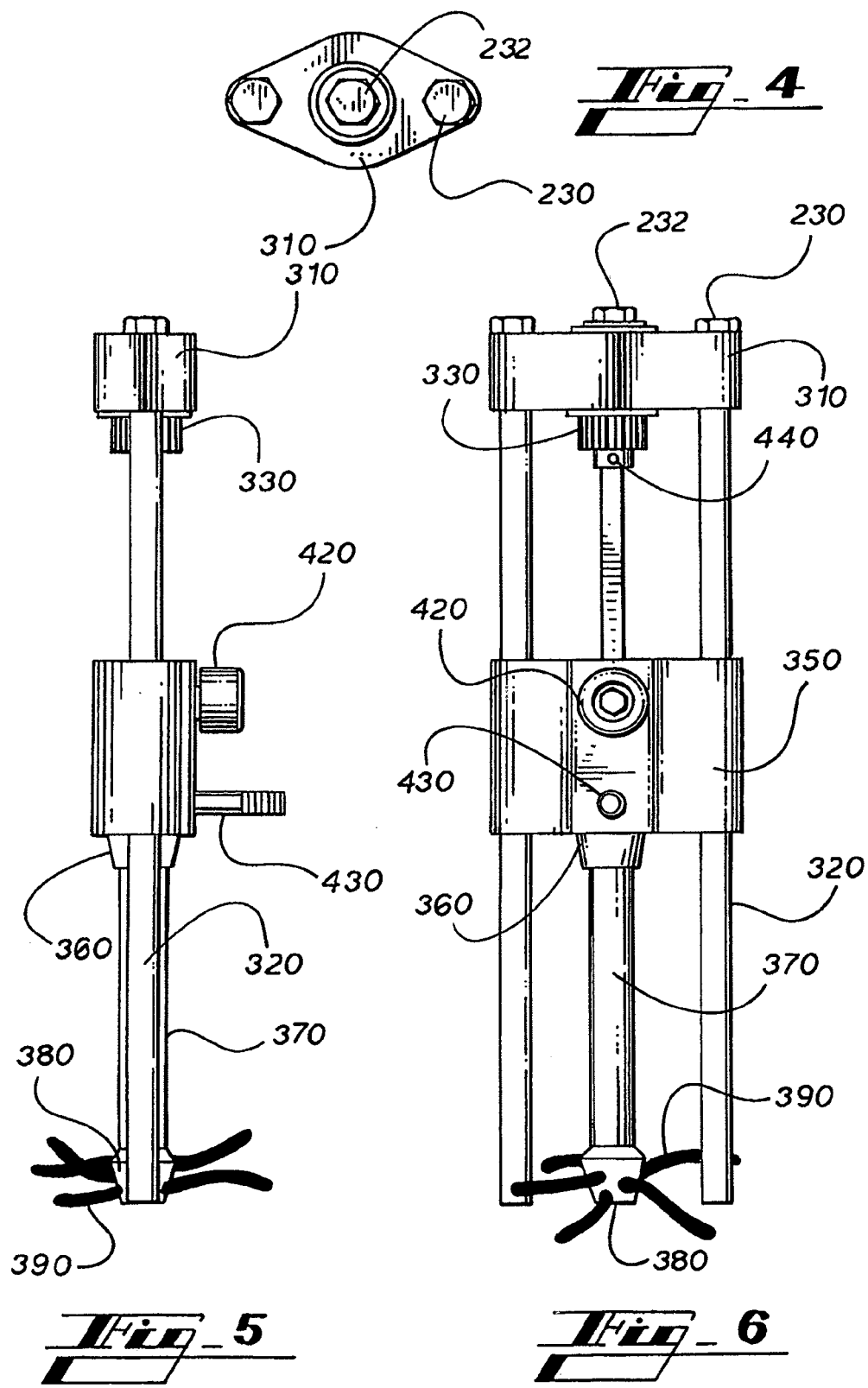

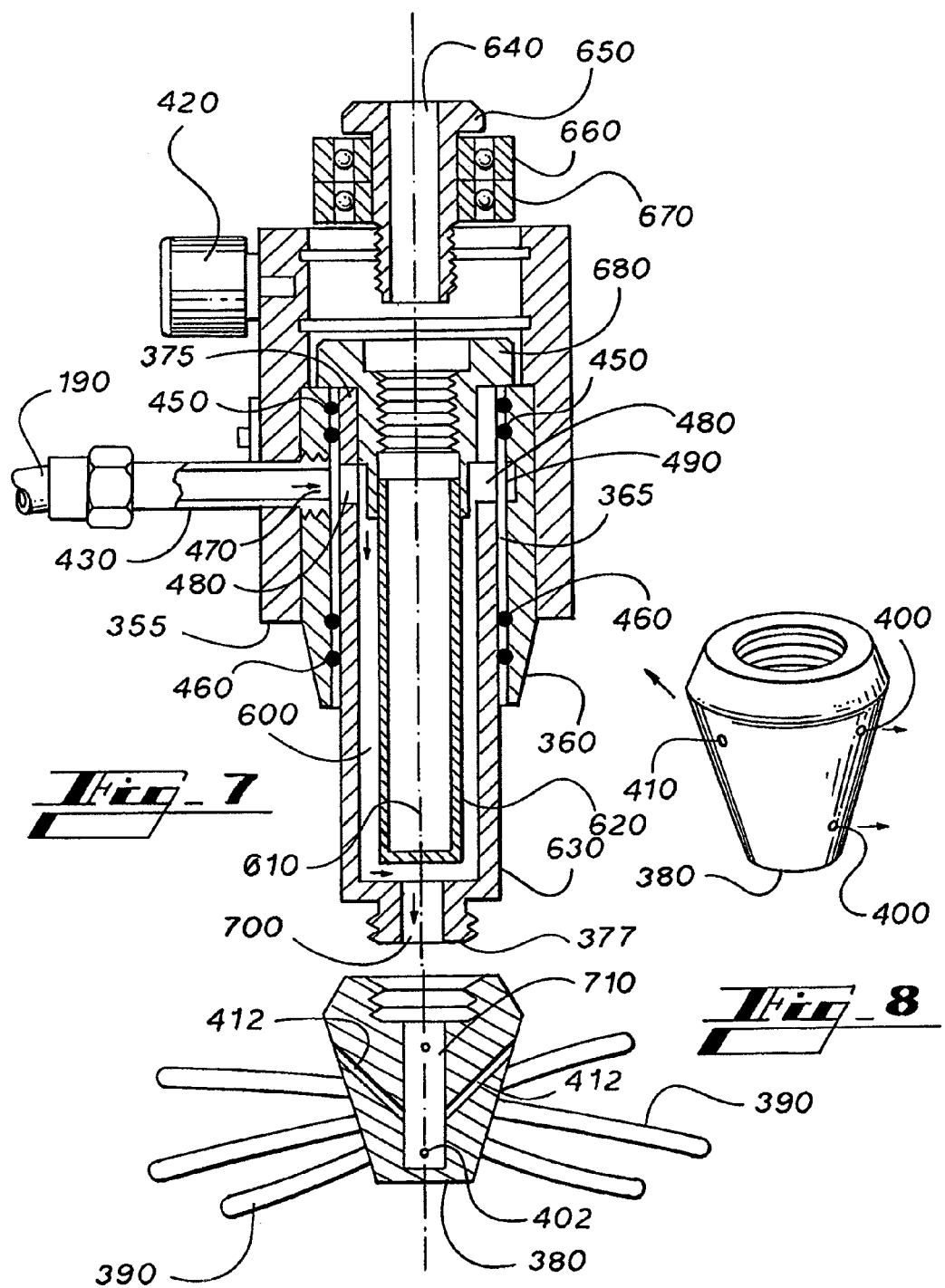

MACHINE FOR CLEANING FOWL AND METHOD OF USE THEREOF

CROSS-REFERENCE TO RELATED APPLICATIONS

This application is a continuation of U.S. application Ser. No. 11/698,662, filed Jan. 26, 2007, which is hereby incorporated herein in its entirety by reference.

BACKGROUND OF THE INVENTION

1. Technical Field of the Invention

The present invention relates generally to machines for cleaning fowl, and more specifically to a scouring and washing wand apparatus that moves within the abdominal cavity and crop cavity of a bird to remove residual viscera, fecal matter and bacteria, thereby cleaning the inside of the cavities.

2. Description of Related Art

In the process of slaughter during poultry processing, contaminants are found about the carcass that are a source of bacteria that can lead to sickness if their level is not reduced. Rigid inspection standards cause the rejection or reprocessing of such carcasses when a level of contaminants occurs that is above the standards. Unfortunately, the process of readying the fowl for cleaning often does not adequately clean the cavities within the fowl and results in remaining sources of contamination.

Various devices exist for the removal of viscera from fowl. Typically, once the fowl have been killed and the head removed, a device having a cutting tip is inserted through the vent into the thoracic, abdominal and pelvic cavities. Such device may or may not reach the crop cavity. The device cuts away the visceral material to leave behind the desired bird carcass. Unfortunately, residual viscera and associated bacteria may remain behind in the fowl's cavities, resulting in the potential for harmful later contamination and/or causation of illness in those who consume portions of the fowl.

Previous attempts to remove the residual viscera and to cleanse the fowl have often resulted in the use of nozzles with pressure sprays that are inserted through the vent of the bird and which subsequently spray water or other cleaning fluids against the cavity walls. One such device extends a crop-removing tool through the ventral cavity into the crop to remove same.

In the poultry processing machine industry, there has typically been one mode of cleaning the internal cavities of poultry. This has been by means of washing modules which have a hollow shaft through which cleaning fluid is dispersed into the poultry cavities. Such previous washing modules are typically moved in and out of the poultry cavities by means of a cam follower which rides around a camming rail that guides movement vertically or horizontally. Unfortunately, such previous devices are disadvantageous since poultry cavities have varying surfaces, occlusions and pockets that make cleaning by spraying out of the cavity with just a spray difficult and inefficient, thereby usually requiring at least two washing devices with their consequent large consumption of cleaning fluid.

Additionally, such cleaning processes have been automated by transport of the fowl to a cleaning station which is typically comprised of a feed track carrying the fowl carcasses in vent up/neck down disposition, wherein the fowl is transported to an insertion point where a cleansing tool is inserted through the vent and extends downward into the crop area to spray the fowl clean. However, while such devices provide a measure of cleaning, their inability to vigorously scour the interior of the cavities results in residual material adhering to the wall surfaces and/or being contained with in occluded pockets that the sprays cannot reach.

One previous device has similar components to the previously-mentioned machine except that a portion of the exit nozzle of the washing module is rotated by the pressure of the cleaning fluid spray exiting the device, in order to distribute cleaning fluid throughout the cavities. Unfortunately, this machine requires a high consumption of cleaning fluid (which is a major cost in poultry processing) to provide adequate spinning force to the exit nozzle to adequately clean, or alternately, requires a plurality of cleaning machines.

Still another previous device has similar components to the previous mentioned machine except it is used for removing the crop of poultry and the hollow shaft of the module into which cleaning fluid is injected is rotated. As with other previous devices, this machine suffers from a high consumption of cleaning fluid to sufficiently clean the fowl, or alternately, requires a plurality of machines.

Therefore, it is readily apparent that there is a need for an apparatus for removal of residual viscera and bacteria from fowl, wherein the apparatus cleans and scours the interior cavities of the fowl to cleanse the fowl of bacteria.

BRIEF SUMMARY OF THE INVENTION

Briefly described, in a preferred embodiment, the present invention overcomes the above-mentioned disadvantages and meets the recognized need for such a device by providing a machine for cleaning fowl by removal of residual viscera, fecal matter and bacteria from fowl, which addresses contamination along with the reduction of cleaning fluid. The apparatus of the present invention comprises a tip having a means of exit for cleaning fluid, wherein brushing tendrils are attached to the tip. The tip is attached to a rotating hollow shaft into which cleaning fluid, such as, for exemplary purposes only, water, is introduced, and wherein the tip is attached to a rotational shaft. The rotational shaft comprises the cleaning module, or wand, wherein a means of engagement is affixed to the top thereof.

The means of engagement is attached to a fixed vertical shaft, upon which a fixed cam comprising timed upward and downward guide tracks transmits upward and downward movement via a horizontal plate attached to bearings mounted to a vertical main shaft above and below the cam. A means of module rotational engagement between these two plates comprises vertical shafts forming a carousel around the cam upon which the modules are driven upward and downward.

According to its major aspects and broadly stated, the present invention in its preferred form is a machine for cleaning fowl comprising cleaning wands having a plurality of tendrils and cleaning fluid jet orifices. The cleaning fluid jet orifices spray cleaning fluid horizontally and at an angle of approximately degrees upwardly from horizontal. The wand has inner and outer jackets between which cleaning fluid pumped from a manifold through hoses to the wand flows and exits from the tip of the wand comprising the above-referenced orifices. Cleaning fluid entering the wand passes through a feed manifold that seals to the spray shaft of the wand via O-rings, thereby preventing leakage of the cleaning fluid. As cleaning fluid enters the feed manifold, it passes into a radial groove that is disposed adjacent openings in the spray shaft to permit cleaning fluid to enter same. The openings are disposed 120 degrees apart to receive cleaning fluid from the manifold. The inner jacket of the wand forms a dry chamber into which a rectangular drive rod is disposed, wherein the drive rod slides horizontally within the chamber permitting the wand to be extended or shortened, while still being driven.

The wand is inserted into the vent of a fowl that is transported along a track that carries the fowl below the wand permitting insertion of the wand into the fowl. A cam follower on the wand causes the wand to follow camming rails that in turn cause the wand to move into and out of the vent of the fowl, while it is being rotated. The cleaning fluid sprays and tendrils scour the inside of the fowl to remove residual viscera and bacteria, thereby cleansing the fowl for later human consumption.

More specifically, the present invention is a machine for cleaning fowl comprising a bird washer having a track assembly, a shaft, a wash assembly, and a plurality of wands disposed symmetrically around the wash assembly. The track assembly comprises a track, a sprocket wheel and hangers that have loops at the bottom.

The wash assembly comprises an upper plate, a main gear, a drum, a manifold and a lower plate. The upper plate is secured to the shaft so that it rotates with the shaft, and is dimensioned to rotate in concert with the sprocket wheel such that the hangers remain adjacent to the wands as the hangers travel around the wash assembly.

The drum is stationary and the upper plate, main gear, lower plate and wands rotate around the drum on the shaft. The drum has a side with a lower camming rail and an upper camming rail. The lower camming rail is continuous and traverses the side, while the upper camming rail is sectional and is thus disposed upon a selected portion or portions of the side.

A manifold is disposed below the drum and has hoses extending therefrom to connect the manifold in fluid communication with wands. The lower plate is disposed below the manifold, and has loop openings symmetrically around its periphery into which the wand passes as it enters a bird travelling adjacently on a hanger.

The wand comprises a mounting block and is supported via guide rails. A drive gear, rotated by movement along the main gear, is connected to a rectangular drive shaft, although other profiles could be utilized. The wand further comprises a sliding module, a feed manifold, a spray shaft with a tip having tendrils thereon, side orifices and angled orifices. The wand is secured between the lower and upper plates. The drive gear engages the main gear, and is rotated by traverse of the wand around the drum.

The sliding module slides up and down on guide rails and holds the spray shaft and feed manifold. The top portion of the spray shaft is disposed within the feed manifold. The tip is disposed at the bottom of the spray shaft and is in fluid communication with the spray shaft and the feed manifold, wherein the feed manifold is in further fluid communication with an inlet tube attached to a hose coming from the manifold below the drum, from which cleaning fluid is pumped.

The feed manifold is separated from the spray shaft by upper O-rings and lower O-rings that seal the feed manifold to the spray shaft to prevent leakage of cleaning fluid. A dry chamber is disposed within the spray shaft to permit the drive shaft to move in and out of the chamber when the wand is moved up and down. The feed manifold has a radial groove that is in fluid communication with openings in spray shaft that are separated from one another by approximately 120 degrees.

Cleaning fluid is pumped through the manifold to the hoses and thence to the wand where it enters via the inlet tube and travels through the feed manifold into radial grooves in the feed manifold. The fluid travels through the spray shaft from the feed manifold into a feed chamber in the tip of the wand from which it exits via tubes through the side and angled orifices.

The sliding module has a cam follower that rolls along camming rails on the drum. The cam follower rides the lower camming rail during periods when the wand is at a stationary height within, or rising out of, the bird or fowl. Thus, during an upward stroke of the wand, the cam follower travels on the lower camming rail. During a downward stroke of the wand, the cam follower rides on upper the camming rail.

A fowl is hung from the loop of the hanger by its leg joints, wherein it is retained by the 'V'-shape loops. The hanger travels on the track assembly arriving adjacent a wand. The wand is inserted into the vent of fowl, the wand travelling downward as the cam follower on the wand follows the upper camming rail. The tip of the wand is moved into the ventral cavity, and subsequently into the crop cavity, wherein the tendrils scrub the sides of the ventral and crop cavities. The wand is subsequently withdrawn as the bird completes its traverse around the wash assembly.

Accordingly, a feature and advantage of the present invention is its ability to cleanse a fowl from bacteria and residual viscera.

Another feature and advantage of the present invention is its ability to economically utilize cleaning fluids.

Still another feature and advantage of the present invention is its ability to reach ventral and crop cavities of a fowl for cleaning thereof.

Yet another feature and advantage of the present invention is its scouring action that cleans occluded areas.

Yet still another feature and advantage of the present invention that it reduces contamination of fowl processing equipment.

A further feature and advantage of the present invention is its ability to spray cleaning fluid both sideways and at an upward angle to clean pockets and occluded areas that would otherwise be inaccessible.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements through out, and in which:

FIG. 1 is a perspective view of a machine for cleaning fowl according to a preferred embodiment of the present invention;

FIG. 2 is a partial side view of a machine for cleaning fowl according to a preferred embodiment of the present invention, shown with fowl installed;

FIG. 3 a partial front view of a machine for cleaning fowl according to a preferred embodiment of the present invention;

FIG. 4 is a top detail view of a wand component of a machine for cleaning fowl according to a preferred embodiment of the present invention;

FIG. 5 is a side view of a wand component of a machine for cleaning fowl according to a preferred embodiment of the present invention;

FIG. 6 is a rear view of a wand component of a machine for cleaning fowl according to a preferred embodiment of the present invention;

FIG. 7 is a cutaway view of a portion of a wand component of a machine for cleaning fowl according to a preferred embodiment of the present invention; and FIG. 8 is a perspective view of a tip of a wand component of a machine for cleaning fowl according to a preferred embodiment of the present invention.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-8, the present invention in a preferred embodiment is machine for cleaning fowl comprising bird washer 10, wherein bird washer 10 preferably comprises track assembly 20, shaft 100, wash assembly 110, and wands 300, and wherein a plurality of wands 300 is preferably disposed symmetrically about wash assembly 110. Track assembly 20 preferably comprises track 30, sprocket wheel 40 and hangers 50, wherein hangers 50 comprise loops 60 preferably disposed at the bottom thereof.

Wash assembly 110 preferably comprises upper plate 120, main gear 130, drum 140, manifold 180 and lower plate 200, wherein upper plate 120 is preferably rotationally secured to shaft 100, and wherein upper plate 120 is preferably dimensioned to rotate in concert with sprocket wheel 40, such that hangers 50 remain disposed in adjacent position to wands 300 as hangers 50 traverse around wash assembly 110.

Drum 140 is preferably stationary, wherein upper plate 120, main gear 130, lower plate 200 and wands 300 preferably rotate around drum 140 on shaft 100. Drum 140 preferably comprises side 150, lower camming rail 160 and upper camming rail 170, wherein lower camming rail 160 is preferably continuous and traverses side 150, and wherein upper camming rail 170 is preferably sectional and is preferably disposed upon selected portions of side 150.

Manifold 180 is preferably disposed below drum 140 and preferably comprises hoses 190, wherein manifold 180 is preferably in fluid communication with wands 300 via hoses 190. Lower plate 200 is preferably disposed below manifold 180, wherein lower plate 200 comprises loop openings 210 preferably disposed symmetrically there around.

Wand 300 preferably comprises mounting block 310, guide rails 320, drive gear 330, drive shaft 340, sliding module 350, feed manifold 360, spray shaft 370 and spray head or tip 380, wherein tip 380 preferably comprises brushes or tendrils 390, side orifices 400 and angled orifices 410. Tendrils 390 are preferably comprised of, for exemplary purposes only, urethane, to provide flexibility and durability for scouring. Mounting block 310 preferably secures wand 300 to upper plate 120 via fasteners 230 (best shown in FIG. 4) and wand 300 is further preferably secured to lower plate 200 via fasteners (not shown). Drive gear 320 preferably engages main gear 130, wherein rotation of drive gear 320 by movement of wand 300 around drum 140 preferably rotates drive shaft 340, wherein drive shaft 340 preferably comprises, for exemplary purposes only, a rectangular profile. It will be recognized by those skilled in the art that drive shaft 340 could comprise a square profile or any other profile than circular.

Sliding module 350 is preferably slidably disposed on guide rails 320 and drive shaft 340 preferably passes within sliding module 350. Feed manifold 360 is preferably disposed partially within sliding module 350, preferably extending downward therefrom. Spray shaft 370 is preferably partially disposed within feed manifold 360, wherein top portion 375 of spray shaft 370 is preferably in full alignment with interior 365 of feed manifold. Tip 380 is preferably disposed at bottom portion 377 of spray shaft 370, feed manifold 360, spray shaft 370 and tip 380 are preferably in fluid communication.

Referring now more particularly to FIGS. 2-6, sliding module 350 of wand 300 preferably comprises cam follower 420, wherein cam follower 420 preferably comprises a roller or similar device such as is known in the art for following camming rails 160, 170. Cam follower 420 is preferably disposed proximate lower camming rail 160 during traversal of wand 300 around drum 140, and proximate upper camming rail 170 for portions of the traverse around drum 140, wherein during an upward stroke of wand 300, cam follower 420 is preferably in contact with lower camming rail 160, and wherein during a downward stroke of wand 300, cam follower is preferably in contact with upper camming rail 170. Sliding module 350 further preferably comprises inlet tube 430, wherein hose 190 is preferably removably secured to inlet tube 430, and wherein manifold 180, hose 190 and inlet tube 430 are preferably in fluid communication.

Drive gear 330 is preferably disposed on drive shaft 320, wherein drive shaft 320 is preferably tapped to receive fastener 235. Tightening of fastener 235 preferably pulls drive gear 330 into contact with pin 440, thereby securing drive gear 330 to mounting block 310.

Referring now more particularly to FIGS. 7 and 8, depicted therein are sliding module 350, feed manifold 360, spray shaft 370 and tip 380, wherein sliding module 350 is preferably disposed over feed manifold 360, and wherein feed manifold 360 preferably extends below bottom 355 of sliding manifold 350. Feed manifold 360 is preferably disposed over top portion 375 of spray shaft 370, wherein feed manifold 360 is preferably separated from spray shaft 370 by upper O-rings 450 and lower O-rings 460, wherein upper O-rings 450 and lower O-rings 460 preferably seal feed manifold 360 to spray shaft 370. Feed manifold 360 preferably comprises radial groove 490, wherein radial groove 490 is preferably in communication with openings 480 in spray shaft, and wherein spray shaft preferably has three openings 480 disposed at approximately 120 degrees there around. Hose 190 is preferably in fluid communication with inlet tube 430 and inlet tube 430 preferably passes through sliding module 350 and is preferably in fluid communication with radial groove 490.

Drive shaft separator 620 preferably comprises chamber 610, wherein drive shaft separator 620 is preferably disposed within spray shaft 370, and wherein drive shaft separator is preferably separated from wall 630 of spray shaft 370 via channel 600. Drive shaft holder 650 is preferably disposed within upper bearing 660 and lower bearing 670, wherein drive shaft holder is preferably threadedly-secured within sliding module 350. Plug 680 is preferably fixedly-secured to, and preferably disposed partially within, feed manifold 360, wherein plug 680 is preferably adapted to threadedly receive drive shaft holder 650, and wherein drive shaft holder 650 preferably comprises drive shaft throughhole 640. Drive shaft throughhole 640 preferably receives drive shaft 340 and preferably fixedly engages drive shaft 340, wherein drive shaft holder 650 and consequently spray shaft 370 are preferably rotated when drive shaft 340 is rotated.

Tip 380 is preferably threadedly-secured to bottom portion 377 of spray shaft 370, wherein outlet 700 of spray shaft 370 is preferably in fluid communication with feed chamber 710 of tip 380, and wherein side orifices 400 and angled orifices 410 are preferably in fluid communication with feed chamber 710 via their respective tubes 402 and 412.

In use, fowl or bird 500 is hung from loop 60 of hanger 50, wherein joints 560 of legs 550 are preferably retained by 'V'-shape loops 60 of hanger 50. Hanger 50 travels on track 30 of track assembly 20, wherein hanger 50 reaches sprocket wheel 40, subsequently passing around sprocket wheel 40 of bird washer 10. As hanger 50 arrives adjacent wand 300, wand 300 is inserted into vent 510 of bird 500, wherein wand 300 travels downward as cam follower 420 follows upper camming rail 170. Tip 380 of wand 300 is moved into ventral cavity 520, subsequently into crop cavity 530 and then is withdrawn via cam follower 420 following lower camming rail 160 as bird 500, hanger 50 and wand 300 complete their traverse around wash assembly 110. As bird 500, hanger 50 and wand 300 travel around wash assembly 110, engagement of drive gear 330 with main gear 130 rotates drive shaft 340 which in turn rotates spray shaft 370 and tip 380 of wand 300, wherein tendrils 390 are vigorously rotated via rotation of tip 380 in concert with cleaning fluid sprayed from orifices 400, 410, thereby scouring and rinsing interior 570 of ventral and crop cavities 520, 530. Cleaning fluid subsequently drains via neck opening 540, wherein cleaning fluid is collected via any means known in the art, such as, for exemplary purposes only, a sump.

Additionally, cleaning fluid is pumped through manifold 180 to hoses 190 and thence to wands 300. Cleaning fluid enters wand 300 via inlet tube 430 traveling through manifold 360 into radial groove 490 thereof. Cleaning fluid is sealed within manifold 360 via O-rings 450, 460 to prevent leakage around spray shaft 370. Radial groove is disposed adjacent openings 480, wherein cleaning fluid exits manifold 360 via openings 480, passing into channel 600 and thence into outlet 700. Outlet 700 is secured to tip 380, wherein tip 380 comprises feed chamber 710, and wherein cleaning fluid passes from outlet 700 into feed chamber 710 and subsequently into tubes 402, 412 from which cleaning fluid sprays from side orifices 400 and angled orifices 410, and wherein cleaning fluid from side orifices 400 travels horizontally away from tip 380 and cleaning fluid from angled orifices 410 travels upwardly at approximately a 45 degree angle between horizontal and vertical.

It is envisioned in an alternate embodiment of the present invention that mounting blocks 310 could comprise any configuration, such as for exemplary purposes only, rectangular or diamond shape, suitable for securing wands 300 to upper plate 120.

It is envisioned in a further alternate embodiment of the present invention that cleaning fluid could be fed separate from wand 300, wherein wand 300 would provide only scouring action via tendrils 390.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method for cleaning at least part of an internal cavity in each of a plurality of fowl traveling along a conveying path, said method comprising the steps of:
    A) providing an apparatus including at least one cleaning wand for dispensing cleaning fluid into a corresponding one of said cavities as said fowl travel along said conveying path, wherein said at least one cleaning wand comprises a plurality of elongated, flexible tendrils, and wherein said wand comprises a first outer jacket and a second inner jacket configured to facilitate the flow of cleaning fluid between said first outer jacket and said second inner jacket prior to said fluid being dispensed from said cleaning wand into said corresponding one of said cavities; and
    B) providing cleaning fluid under pressure to said one cleaning wand such that said cleaning fluid first flows between said first outer jacket and said second inner jacket and then is subsequently dispensed from said cleaning wand into said corresponding one of said cavities.

2. The method as claimed in claim 1,
    wherein in steps "A" and "B", said one cleaning wand is a first cleaning wand configured for dispensing fluid into a first one of said fowl cavities,
    wherein step "A" further comprises providing a second cleaning wand configured for dispensing fluid into a second one of said fowl cavities, and
    wherein step "B" further comprises providing cleaning fluid under pressure to said second cleaning wand such that said fluid is eventually dispensed into said second one of said fowl cavities.

3. A method for cleaning at least part of an internal cavity in each of a plurality of fowl traveling along a conveying path, said method comprising the steps of:
    A) providing an apparatus including at least one cleaning wand for dispensing cleaning fluid into a corresponding one of said cavities as said fowl travel along said conveying path, wherein said at least one cleaning wand comprises a plurality of elongated, flexible tendrils and also comprises a cam following roller;
    B) providing a camming rail configured to track said camming rail such that said cleaning wand is raised and lowered;
    C) moving said cleaning wand relative to said camming rail, such that said cam following roller tracks said camming rail and said one cleaning wand is raised and lowered such that said elongated, flexible tendrils are positioned within said corresponding one of said cavities as said fowl travel along said conveying path; and
    D) providing cleaning fluid to said cleaning wand such that said wand provides cleaning fluid into said corresponding one of said cavities during at least a portion of the time said elongated flexible tendrils are positioned within said corresponding one of said cavities.

4. The method as claimed in claim 3,
    wherein in steps "A" through "D", said one cleaning wand is a first cleaning wand configured for dispensing fluid into a first one of said fowl cavities,
    wherein step "A" further comprises providing a second cleaning wand configured for dispensing fluid into a second one of said fowl cavities, and wherein step "D" further comprises providing cleaning fluid under pressure to said second cleaning wand such that said fluid is eventually dispensed into said second one of said fowl cavities.

5. A machine for cleaning at least part of an internal cavity in each of a plurality of fowl traveling along a conveying path, said machine comprising:
at least one cleaning wand for dispensing cleaning fluid into a corresponding one of said cavities as said fowl travel along said conveying path, said at least one cleaning wand comprising a plurality of elongated, flexible tendrils; and
a wand indexing device for causing said cleaning wand, including said plurality of elongated flexible tendrils, to be raised and lowered such that said elongated flexible tendrils are positioned within said corresponding one of said cavities as said fowl travel along said conveying path.

6. The machine as claimed in claim 5, wherein said cleaning wand is elongate and includes a rotational axis substantially parallel to its longitudinal axis, and wherein said machine further comprises a wand rotating device for causing said cleaning wand, including said plurality of elongated flexible tendrils, to be rotated about said rotational axis relative to said corresponding one of said cavities while said elongated flexible tendrils are positioned within said corresponding one of said cavities as said fowl travel along said conveying path.

7. The machine as claimed in claim 5, wherein said cleaning wand comprises a plurality of cleaning fluid outlet ports configured to allow cleaning fluid to be dispensed from said cleaning wand into said corresponding one of said cavities.

8. The machine as claimed in claim 5, wherein said cleaning wand including a cleaning wand body, and wherein said plurality of elongated flexible tendrils includes a first tendril and a second tendril portion, each of said portions extending generally radially away relative to said longitudinal axis of said wand body.

9. The machine as claimed in claim 8, wherein said first tendril and a second tendril portion extend generally in opposite radial directions from each other relative to said cleaning wand body.

10. The machine as claimed in claim 8, wherein said cleaning wand comprises a plurality of cleaning fluid outlet ports configured to allow cleaning fluid to be dispensed from said cleaning wand into said corresponding one of said cavities, at least one of said ports being positioned a distance between said those of said first and second tendril portions, said distance being as measured along the length of said cleaning wand body.

11. The machine as claimed in claim 5, wherein said cleaning wand comprises a first outer jacket and a second inner jacket configured to facilitate the flow of cleaning fluid between said first outer jacket and said second inner jacket prior to said fluid being dispensed from said cleaning wand into said corresponding one of said cavities.

12. A method for cleaning at least part of an internal cavity in each of a plurality of fowl traveling along a conveying path, said method comprising the steps of:
A) providing an apparatus including at least one cleaning wand for dispensing cleaning fluid into a corresponding one of said cavities as said fowl travel along said conveying path, said at least one cleaning wand comprising a plurality of elongated, flexible tendrils; and
B) indexing said cleaning wand, including said plurality of elongated, flexible tendrils, from a raised to a lowered position as said fowl travel along said conveying path, such that said elongated flexible tendrils are positioned above and outside said corresponding one of said cavities when said cleaning wand is in said raised position, and such that said elongate flexible tendrils are positioned inside said corresponding one of said cavities when said cleaning wand is in said lowered position; and
C) rotating said cleaning wand when in said lowered position such that said elongated flexible tendrils provide a cleaning function within said corresponding one of said cavities.

13. The method as claimed in claim 12, wherein in step "C", said cleaning wand is rotated the entire time said cleaning wand is in said lowered position.

14. The method as claimed in claim 13, wherein in steps "B" and "C", said lowered position is the lowermost position said cleaning wand is ever lowered into said corresponding one of said cavities, and also wherein in step "C", said cleaning wand is rotated the entire time said cleaning wand is in said lowermost position.

15. The method as claimed in claim 14, wherein in step "C", said cleaning wand is rotated by use of a direct drive gear assembly.

16. A method for cleaning at least part of an upwardly-directed internal cavity in each of a plurality of fowl traveling along a substantially horizontal conveying path, said cavity having a horizontal cross section of varying sizes depending upon the height taken of said cross section, including a first horizontal cross section being different in shape than said second horizontal cross section, said method comprising the steps of:
A) providing an apparatus including at least one cleaning wand for dispensing cleaning fluid into a corresponding one of said cavities as said fowl travel along said conveying path, said at least one cleaning wand comprising a plurality of elongated, flexible tendrils; and
B) indexing said cleaning wand, including said plurality of elongated, flexible tendrils, downwardly from a first to a second vertical position within said corresponding one of said cavities as said fowl travel along said conveying path, such that said elongated flexible tendrils are positioned proximate said first horizontal cross section within corresponding one of said cavities when said cleaning wand is in said first vertical position, and such that said elongate flexible tendrils are positioned proximate said second horizontal cross section inside said corresponding one of said cavities when said cleaning wand is in said second vertical position; and
C) rotating said cleaning wand as said cleaning wand is moved downwardly from said first to said second vertical position, causing said elongate flexible tendrils to be moved from proximate said first horizontal cross section of said cavity to proximate said second horizontal cross section of said cavity, such that flexion of said elongate flexible tendrils tend to cause said tendrils to conform to the inside of said cavity and to provide a cleaning function therein.

* * * * *